(No Model.) 3 Sheets—Sheet 2.
H. WILLIAMS & J. L. ALBERGER.
METHOD OF TREATING GRAIN FOR THE PRODUCTION OF STARCH OR STARCH SUGAR AND SIRUP. AND APPARATUS THEREFOR.
No. 248,973. Patented Nov. 1, 1881.
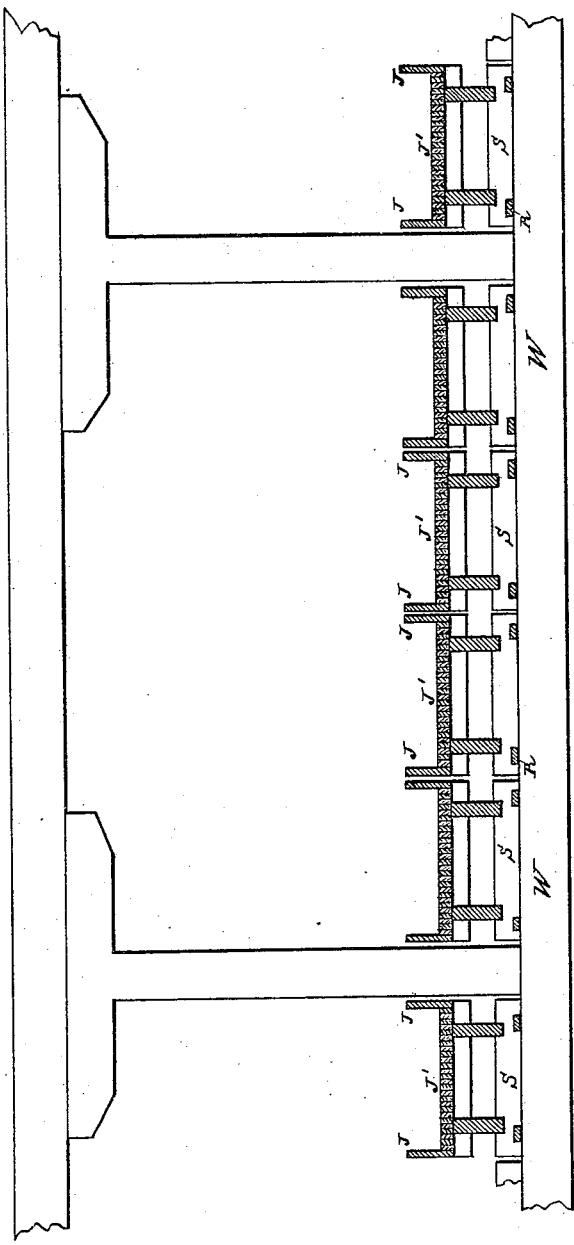
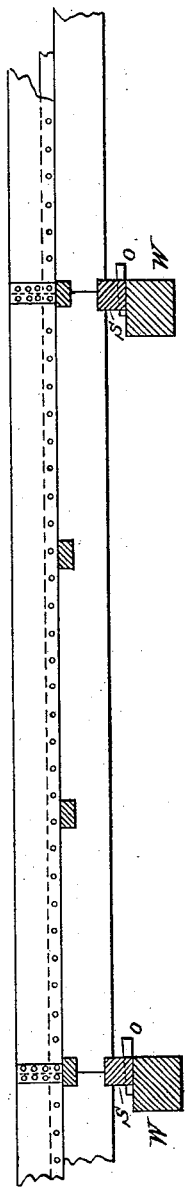
WITNESSES:
A. Moore
A. Whitman
INVENTOR
Horace Williams
John L. Alberger
BY
Amos Broadnax
ATTORNEY (No Model.) 3 Sheets—Sheet 3.
H. WILLIAMS & J. L. ALBERGER.
METHOD OF TREATING GRAIN FOR THE PRODUCTION OF STARCH OR STARCH SUGAR AND SIRUP, AND APPARATUS THEREFOR.
No. 248,973. Patented Nov. 1, 1881.
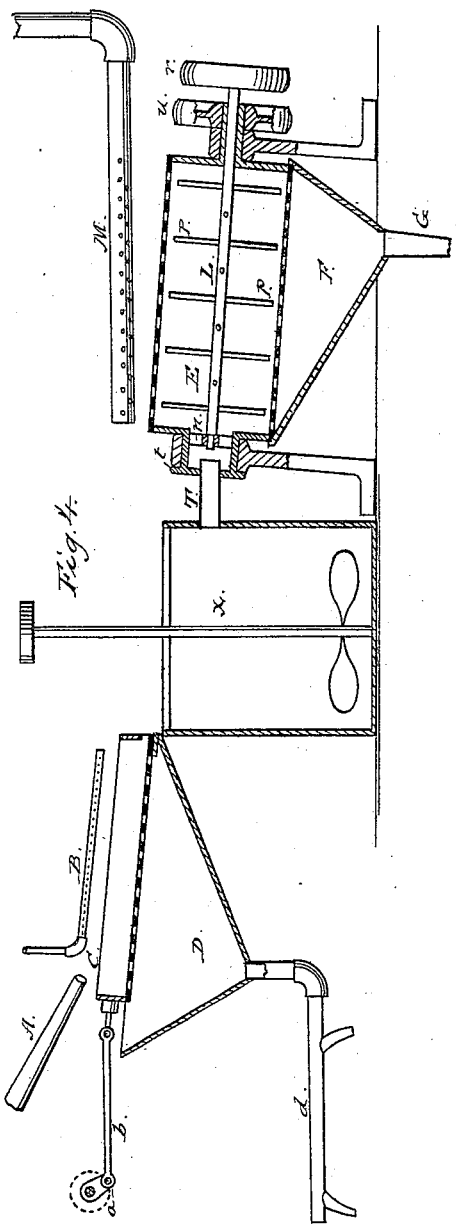
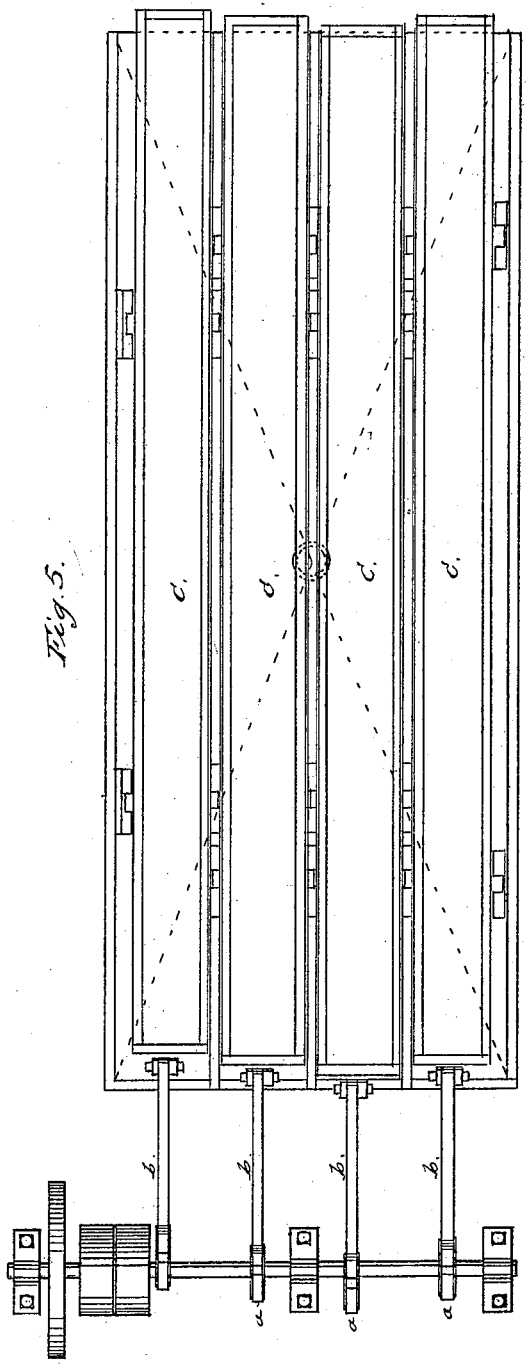

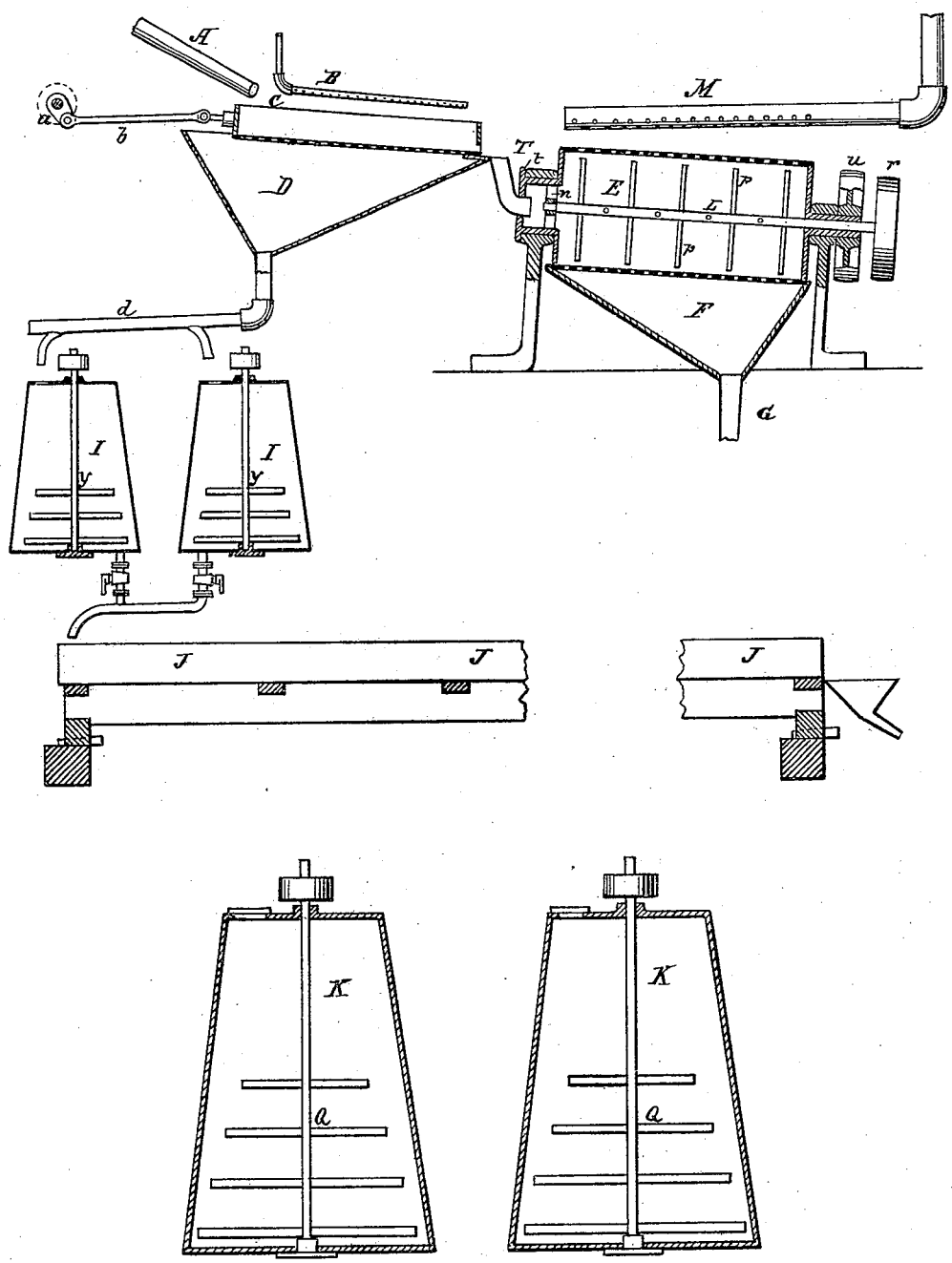

UNITED STATES PATENT OFFICE.

HORACE WILLIAMS AND JOHN L. ALBERGER, OF BUFFALO, NEW YORK.

METHOD OF TREATING GRAIN FOR THE PRODUCTION OF STARCH OR STARCH SUGAR AND SIRUP, AND APPARATUS THEREFOR.

SPECIFICATION forming part of Letters Patent No. 248,973, dated November 1, 1881.

Application filed September 30, 1881. (No model.)

*To all whom it may concern:*

Be it known that we, HORACE WILLIAMS and JOHN L. ALBERGER, of Buffalo, county of Erie, and State of New York, have jointly invented a certain new Improvement in Methods of Treating Grain for the Production of Starch or Starch Sugar and Sirup, and Apparatus therefor, to be used in the practice of our method of obtaining the starch and of treating the grain; and we do hereby declare the following to be a description of our said invention, in such full, clear, concise, and exact terms as to enable any one skilled in the art to which our invention appertains, or with which it is most nearly connected, to make and use the same, reference being had to the accompanying drawings, making part of this specification, and to the figures or letters of reference marked thereon.

By Figure 1 of the drawings is shown an elevation of all the principal parts and combination of parts comprising our apparatus used in the practice of our improved method of obtaining starch. Fig. 2 is a cross-section of the starch-tables, and Fig. 3 a longitudinal elevation of the same. Figs. 4 and 5 are detail parts and modifications, to be hereinafter referred to.

Our invention consists, first, of a novel method of obtaining the starch from the grain; second, of certain novel combinations of mechanical apparatus by which our method is accomplished.

Our method consists of, first, soaking the grain—Indian corn, for example—in water raised to 140° of Fahrenheit for a period of from twenty-four to thirty-six hours, depending upon the dryness of the grain and the temperature of the weather; second, of then drawing off the steeping-water and grinding the corn in the presence of a stream of clean water, proportioning the grain and water so as to obtain a combination of meal and water of about the consistency of cream mixed with the husk of the corn; third, of delivering this combination of ground grain, husk, and water upon or into a separator, by which the greater portion of the starch is loosened and separated from the husk and coarser portions of the ground grain, and by which the coarsely-ground parts of the grain is delivered into a second and coarser separator, from which it is again returned to the mill, reground, and again delivered upon or into the first separator, for the purpose of more perfectly liberating and obtaining all the starch from the grain, the husks of the corn being separated from the coarsely-ground portions, the latter going back to the mill for regrinding, while the former is discharged from the second separator thoroughly washed and separated from all the gluten and starchy portions of the grain; fourth, of delivering the starch and water as it is separated from the bran and coarsely-ground grain into suitable receiving-tanks containing agitators or stirrers; fifth, of adding to the solution of starch, water, gluten, and albumen of the grain in the first receiving-tank a solution of caustic alkali and water, using about five-eighths ($\frac{5}{8}$) of a pound of alkali for every bushel of ground corn in the tank under treatment, reducing the alkali with water down to the required strength necessary to dissolve the gluten, and of then agitating this solution for three or four hours; sixth, of delivering this alkaline solution during agitation and in an even stream upon a set of starch-tables set at a slight inclination, off of which the gluten and albumen run with the water, leaving the starch nearly pure and distributed over the surface of the tables; seventh, of collecting the deposited starch off of the tables into suitable receiving-tubs, provided with agitators; eighth, of washing the alkali out of the starch, either in suitable tubs or on tables, which latter is preferable, and of converting it into sugar or preparing it for domestic use in the usual way.

The mechanical devices and combination of devices used by us in the practice of the foregoing method consist—

First. Of a large tub or tank in which the corn is soaked, (not shown by the drawings,) it being merely an ordinary tub large enough to hold the desired quantity of grain.

Second. Of an ordinary run of grinding-stones for reducing the corn into a pulp with water. This run of stone, being also of the ordinary construction, is not shown in the drawings.

Third. Of one or more shaking separators, C, upon which the ground grain is delivered under a spray of water falling from a spraying device, B, the ground grain and water coming from the mill upon the separator in the form of a thick pulp through a pipe, A. This shaking separator, a plan of which is shown by Fig. 4, consists of one or more horizontal sieves set at a slight inclination and covered with fine bolting-cloth, and each of which is shaken by a crank-wheel, a, and connecting-rod b, or by any of the well-known means of shaking a sieve. These sieves are fitted with side pieces, and set over a receptacle, D, having an angular sloping bottom terminating in a pipe, d, leading to the receiving-tubs I I. This receptacle is fitted with suitable slideways to carry the sieves, which are adjusted over the receptacle so as to bring their open or delivering ends about even with the rear end of the receptacle, the tail end of the sieves delivering the husks and coarsely-ground meal into the mouth of a pipe, T, leading to a second sieve consisting of a rotating bolting-machine, E, or to an ordinary receiving-tub, fitted with an agitator, as shown by Fig. 5. The rotating bolting-machine is operated by machinery, and is set over a receptacle, F, the bottom of which slopes downward and terminates in a pipe, G, leading to an ordinary tub fitted with an agitator, and an ordinary forcing and lifting pump, (not shown in the drawings,) these last-mentioned parts being of any suitable construction adapted to the purposed of receiving, agitating, and pumping the mixture of meal, starch, and water. This rotating bolting-machine is composed of wire-cloth coarser in texture than the cloth covering the reciprocating sieves C, and may be fitted with a rotating agitator or beater, L, to thoroughly beat out the coarse particles of grain and expose the husk to the action of the water, which should be used in abundance, by which the last trace of starch and coarsely-ground grain is washed out of the husk, the rotating bolting-machine being exposed to a constant shower of water delivered upon it from the pipe m. The said bolting-machine is carried upon hollow trunnions t, in one of which the pipe T leads, fitted with an ordinary stuffing-box. (Not shown in the drawings.) On the other trunnion the pulley u is fitted to drive the machine. One end of the beater-shaft L, supplied with arms p, is carried by a skeleton-bearing, n, set in the trunnion against the end of the pipe T. The other end of the said shaft has its bearing in the opposite trunnion, and is fitted with a pulley, r, by which it is driven.

Fourth. Of a set of starch-tables, a cross-section of which is shown by Fig. 2, and a longitudinal section by Fig. 3. These starch-tables are made of wood and rest upon the principal beams of the building, and are, preferably, about one hundred and thirty feet long, three feet wide, and about eight inches deep, in the clear. The bottoms of these tables are composed of strips of wood about two and a half (2½) inches deep and about one (1) inch thick, thoroughly painted or covered with paraffine or suitable material to render them water-proof, set on their edges and nailed together, forming a continuous floor of strips of wood set edgewise, as shown by J'. The side pieces of the tables are shown by J. These tables are set upon their supporting-frames at a slight angle or inclination in the direction of their length, which inclination and their lateral adjustment is regulated by wedge-shaped keys O driven in notches R, cut in the timbers S that support the frame of the table upon the principal beams W; or, what is preferable, the inclination of the tables are adjusted by strips of metal or wood placed on the supporting-beams under the tables, the latter being made so that they can be raised at any point, and thin pieces of metal or wood placed under them to obtain the exact adjustment required, either crosswise or lengthwise.

Fifth. Of washing-tanks K K provided with agitators Q, into which the starch is collected from the tables and washed, (but as a substitute for these tanks for washing the starch, or as an adjunct to them, we may use these tubs merely to receive the starch from the first tables and agitate it with water;) and then to finally wash and collect the pure starch we deliver it from these tanks upon a second set of starch tables constructed substantially like the first. From these last-mentioned tables the starch is collected and dried for domestic use or converted into sugar, as may be desired.

Operation: The corn, being duly soaked, as aforesaid, passes into the hopper of the mill with a stream of water rightly proportioned with reference to the grain, as aforesaid. It is ground in the mill to a thick pulp, and passes from thence onto the shaking separators C under a spray of water from pipe B, the starch-water passing through the bolting-sieves into the receptacle D; thence through pipe d into tubs I I by branch pipes, as shown, the coarsely-ground particles of the grain and refuse passing off the tail of the sieves, through the pipe T, into the rotating bolting-machine E, (or into an intervening tub, X, as described,) under a spray of water from the pipe m. Here the starch and coarsely-ground parts of the grain are thoroughly washed out of the husks and pass into the receptacle F, and from thence through a pipe, G, leading to a reservoir fitted with a forcing and lifting pump, by which the water and grain and any particles of starch that may be carried over the tail of the sieves are thrown back into the reservoir which supplies the mill with water, from whence it passes again into the mill, and is reground along with the new grain, and delivered onto the first separators and finally in the tubs I I. In these tubs the starch is subjected to the alkaline treatment and agitation by the agitators y, and from thence while in a state of agitation it passes upon the starch-tables, from whence the gluten and refuse is carried by the water off of the ends of the tables into suitable receivers, and upon which tables the starch settles and is gathered into the tanks K K and duly washed by the treatment aforesaid.

In concluding our description of this invention we observe that in washing the tailings from the first sieve or separator, C, it is necessary to use an abundance of water, and it is preferable to introduce a receiving-tank between the coarse and fine separators, as shown by Fig. 5, said tank to be fitted with a suitable agitator and pipes to receive the tailings and water, and deliver them from the fine sieve into the coarse one, the object of the intervening tank being to beat loose and wash off the coarsely-ground grain that is stuck fast to the husk by the gluten or sticky properties of the grain; and we further observe that we do not grind the tailings from the separator in a separate mill, nor do we regrind the husks at all. On the contrary, we entirely eliminate the husks from the other tailings of the first separator by causing the starchy particles and coarsely-ground grain to pass with the water through the coarser meshes of the second or rotating separator, thus discharging the husk, cleanly washed, as a refuse, and passing the starch and coarsely-ground grain and water that is washed out of the husk back into the reservoir that supplies the mill with water. We desire to say, also, that by our method of constructing our starch-tables we obtain a solid stiff bottom, impervious to water, and not liable to warp, get out of adjustment, or become sour by absorption of starch-liquor; nor is it liable to splinter and peel off, and become rough and uneven on the surface.

Having thus described our invention, we claim—

1. The method, substantially herein described, of treating the grain for the purpose of obtaining the starch, which method consists of the following steps in combination: first soaking the grain in hot water, then grinding it in the presence of a stream of clean water, then separating the starch and gluten from the first grinding upon a fine separator, then passing the coarsely-ground grain with the husks into a second separator of coarser texture and separating the coarsely-ground grain and starch from the husks by the second separator, then passing the wash-water from the second separator, including the coarse meal and starch carried off by it, into the reservoir supplying the mills with water, then treating the starch-water in the receiver with alkali in the presence of agitation, then separating the starch from the gluten, &c., then washing the alkali out of the starch, substantially as described.

2. In the process of manufacturing starch from corn, the mechanical method of treating the husk of the corn after being soaked and wet-ground for the purpose of separating more perfectly the adhering meal and starch from the husk, which method consists of first delivering the whole product of the mill upon or into a fine separator under a spray of water, by which the starch is washed out, then passing the husk and coarse meal into a second coarser separator under a spray of water, by which the coarse meal and any remaining starch are carried through the meshes of the separator, the husk being delivered from the tail thereof, both separators being continually agitated.

3. In the manufacture of starch from corn, the means, substantially herein described, of separating more perfectly the adhering starch and meal from the husk of the corn after being soaked and wet-ground, which means consist of a fine reciprocating separator, C, in combination with a coarser rotating bolting-machine, E, the two separators coacting to receive, agitate, and discharge the starch, meal, and husks, substantially as described.

4. In the treatment of soaked ground corn in the manufacture of starch, the combination of a reciprocating separator, C, receiving alkaline tubs I I, fitted with agitators $y$, a rotary bolting-machine, E, fitted with an agitator, and water-pipes B M, the several parts being constructed and coacting with reference to each other, substantially as described, for the purpose specified.

5. As an improvement in apparatus used in the manufacture of starch, the bottom of the starch-table composed of vertical lamina of wood, for the purpose of avoiding the warping, slivering, and uneveness of the depositing-surface.

6. In combination with a separator, C, and a rotating bolting-machine, E, an intervening tank, X, provided with an agitator, and connected to both the reciprocating and rotating separator.

HORACE WILLIAMS.
JOHN L. ALBERGER.

Witnesses:
THOMAS S. CUTTING,
FRED S. MILLER, Jr.